United States Patent
Knuth et al.

(10) Patent No.: US 7,674,502 B2
(45) Date of Patent: Mar. 9, 2010

(54) UV-RADIATION-CURABLE PRECIOUS-METAL PREPARATION, TRANSFER PICTURES CONTAINING SAID PREPARATION, AND PROCESS FOR DECORATION

(75) Inventors: Kersken Knuth, Darmstadt (DE); Maurizio Ragnetti, Mainz-Kostheim (DE); Robert Sievi, Alzenau (DE); Frank Walter, Rüsselsheim (DE); Andreas Schulz, Offenbach (DE)

(73) Assignee: Ferro GmbH, Frankfurt am Main (DE)

( * ) Notice: Subject to any disclaimer, the term of this patent is extended or adjusted under 35 U.S.C. 154(b) by 214 days.

(21) Appl. No.: 11/570,159

(22) PCT Filed: Jun. 22, 2005

(86) PCT No.: PCT/EP2005/006764

§ 371 (c)(1), (2), (4) Date: Feb. 22, 2007

(87) PCT Pub. No.: WO2006/002819

PCT Pub. Date: Jan. 12, 2006

(65) Prior Publication Data

US 2007/0243336 A1 Oct. 18, 2007

(30) Foreign Application Priority Data

Jun. 30, 2004 (DE) .................. 10 2004 031 692

(51) Int. Cl.
*B05D 3/06* (2006.01)

(52) U.S. Cl. .................. 427/487; 427/493; 427/146; 427/151; 428/914

(58) Field of Classification Search .................. None
See application file for complete search history.

(56) References Cited

U.S. PATENT DOCUMENTS

| 5,705,664 | A * | 1/1998 | Schulz et al. ............... 556/113 |
| 2005/0028895 | A1 * | 2/2005 | Walter et al. ............... 148/430 |
| 2006/0194920 | A1 * | 8/2006 | Capote et al. ............... 524/779 |

FOREIGN PATENT DOCUMENTS

| DE | 3819414 C1 | 2/1989 |
| DE | 10328531 A1 | 1/2005 |
| DE | 10328524 A1 | 2/2005 |
| WO | WO 03/022781 | * 3/2003 |

OTHER PUBLICATIONS

International Search Report for PCT/EP2005/006764 dated Oct. 27, 2005, two pages.

* cited by examiner

*Primary Examiner*—Erma Cameron
(74) *Attorney, Agent, or Firm*—Rankin, Hill & Clark LLP

(57) ABSTRACT

The invention relates to a radiation-curable precious-metal preparation, in particular a bright-gold preparation, that contains—in addition to a gold compound, which in particular is soluble in the printing medium, and further customary organometallic compounds—a radiation-curable, in particular UV-curable, printing medium, the polymerisation being initiated by the UV radiation and proceeding in accordance with a cationic mechanism which may optionally be assisted by y process that takes place simultaneously in accordance with a radical mechanism. The invention also relates to a transfer picture containing the precious-metal preparation, and to a process for decorating substrates that are suitable for decoration firing by direct application/printing and indirect printing (decalcomania).

18 Claims, No Drawings

UV-RADIATION-CURABLE PRECIOUS-METAL PREPARATION, TRANSFER PICTURES CONTAINING SAID PREPARATION, AND PROCESS FOR DECORATION

The invention relates to a radiation-curable precious-metal preparation, in particular a bright-gold preparation, that contains—in addition to a gold compound, which in particular is soluble in the printing medium, and further customary organometallic compounds—a radiation-curable, in particular UV-curable, printing medium, the polymerisation being initiated by the UV radiation and proceeding in accordance with a cationic mechanism which may optionally be assisted by a process that takes place simultaneously in accordance with a radical mechanism. The invention also relates to a transfer picture containing the precious-metal preparation, and to a process for decorating substrates that are suitable for decoration firing by direct application/printing and indirect printing (decalcomania).

Various precious-metal preparations, in particular gold preparations, are already known that can be applied by means of direct or indirect printing—that is to say, by means of transfer technology—on substrates suitable for decoration firing and that in the course of decoration firing result in a lustrous or buffable precious-metal decoration. Preparations that result in lustrous decorations are designated as bright-gold preparations. Bright-gold preparations contain one or more organic precious-metal compounds that are substantially soluble in an organic medium. Typical precious-metal compounds for bright-precious-metal preparations are so-called resinates, but in particular sulforesinates—that is to say, thiolates of terpenethiols—and also synthetic precious-metal compounds of various other organic mercapto compounds. So-called burnished-precious-metal preparations, in particular burnished-gold preparations contain the precious metal in powder form and also, optionally, additionally in the form of compounds that are soluble and/or insoluble in the medium, such as gold sulfide. Ordinarily, precious-metal decorative preparations, especially precious-metal bright preparations, also contain one or more soluble fluxing agents, in particular organic compounds, resinates, carboxylates and alcoholates, in particular of the elements from the series comprising Rh, Bi, Cr, V, Ni, Co, Fe, Sn, Zr, Ta, Si, B, Al and Cu, which influence the formation of the film of precious metal and its adhesion. In the case of burnished-gold preparations these fluxing agents may also be used in insoluble form, such as oxides, silicates, etc. A medium that is also suitable in preparations for transfer pictures consists substantially of one or more mutually compatible binding agents and solvents for the resins and precious-metal compounds, optionally also for the flux constituents. Here reference is made in exemplary manner to DE 100 50 949 A1, DE 24 35 859, DE 199 15 937 A1, DE 199 41 020 A1 and EP 1 295 855 A1, as well as the publications cited therein.

An alternative to the gold compounds described above is constituted by the gold nanoparticles described in WO 01/68596 and also gold clusters such as are mentioned in exemplary manner in DE 197 04 479 A1.

In the case of the transfer pictures required for indirect printing, a picture layer consisting of or containing the precious-metal preparation is applied—directly or on a backing layer—onto a support, in particular onto a paper provided with a water-soluble layer of glue or provided with a layer of wax, and this layer is filmed over, optionally after applying an interlayer containing a glass flux, observing the necessary drying-times. Reference is made in exemplary manner to DE 12 32 168, DE 36 16 547 C1 and DE 31 22 546 C2.

The screen-printing paste for gold decorations according to DE-OS 21 11 729 also contains a commercial screen-printing oil, such as solutions of polymethyl methacrylate or ethyl cellulose in high-boiling solvents such as ethyl glycol acetate, butyl acetate or white spirit. WO 01/40392 A1 likewise describes the use of acrylate polymers such as, for example, poly(isobornyl methacrylate), dissolved in cyclohexanone, in liquid gold preparations.

A disadvantageous aspect of these aforementioned precious-metal preparations is constituted by the long drying-times of the picture layer and also the associated ecological problems due to the evaporation of organic solvents. The drying of the screen-printing paste that occurs during the printing process must also be mentioned as a known cause of a reduction in quality.

In order to avoid the problems inherent in conventional organic print media—that is to say, the long drying-times and also ecological and technical problems due to evaporation of solvent—radiation-curing media, in particular UV-curing media, have been developed that can be employed in bright-precious-metal preparations or in burnished-gold preparations.

Printed patent specification DE 30 48 823 accordingly teaches a UV-radiation-curable resinous composition consisting of a special saturated copolyester, a polymerisable component with a polymerisable group, and also a polymerisable component with two or more polymerisable groups, a photosensitiser and optionally other synthetic resins, pigments, slip additives, levelling agents, anti-foaming agents, thickening agents and thixotroping agents for the purpose of adjusting the printing properties, and inhibitors of thermal polymerisation. Suitable by way of photosensitiser, in order to promote and accelerate the photopolymerisation of the aforementioned polymerisable components, are the following compounds: benzoins, for example benzoin methyl ether, benzoin ethyl ether, benzoin isopropyl ether, benzoin, and α-methylbenzoin, anthraquinones, for example 9,10-anthraquinone, 1-chloroanthraquinone and 2-chloroanthraquinone, benzophenones, for example benzophenone, p-chlorobenzophenone and p-dimethylaminobenzophenone, sulfurous compounds, for example diphenyl disulfide, pigments, for example eosin, fluoroescein and also compounds from the group consisting of xanthone, thioxanthone and their derivatives.

Depending on the intended use of the UV-curable resinous composition according to DE 30 48 823 C2, said resinous composition may contain known inorganic pigments and also gold, such as generally find application for the decoration of siliceous substrates. However, no indication can be gathered from this document whereby use is made of soluble organic gold compounds that are important for the production of bright-precious-metal preparations.

EP 0 052 763 describes a process for the direct printing of ceramic inks onto glass, ceramics or metal. The decorative ink is made into a paste with a printing medium, said printing medium consisting of prepolymers of certain polyfunctional acrylic esters, monofunctional, difunctional and trifunctional acrylates corresponding to the prepolymer, polymethyl methacrylates of various degrees of polymerisation, monomers of various methacrylates, monomeric and polymeric plasticisers, monomeric solution of various alkyd resins and also photoinitiator systems of the classes represented by ketals, acrylic ketones, benzophenones and the like. The wavelength range that is used for the irradiation lies between 280 nm and 410 nm; the specific power of the UV radiation amounts to 20

W/cm$^2$ to 180 W/cm$^2$. For a curing-time or polymerisation-time of the individual ink layers from 1 sec to 20 sec, the power of the UV radiators lies between 200 W and 10 000 W.

In EP 0 106 628 a printing ink for the decoration of ceramics, glass or metal—directly or via transfer pictures—is described which has to be cured by radiation, preferably by UV radiation. In addition to the colour-imparting material, which may be a ceramic decorative ink or metal powder, e.g. gold powder, the printing ink consists of completely polymerised thermoplastic resin, a diluent capable of being cured by radiation, and a photoinitiator. The resins may be acrylic resins, colophony resins, ketone resins, hydrocarbon resins and cellulose derivatives. The diluents may be polymerisable monofunctional or polyfunctional acrylates that possess an ethylene-type double bond. By way of photoinitiators, ketones and their derivatives are employed in particular.

In JP 59 141473 a process for creating illustrations with gold inks, silver inks and platinum inks on ceramic products is described in which organic compounds of gold, platinum, palladium and other precious metals and also organic compounds of chromium, nickel, bismuth, cobalt etc. and 5-80 wt. % of an ultraviolet-radiation-curing synthetic-resin mixture is printed onto a paper that has been appropriately coated with dextrin, this mixture is cured by means of UV rays, and then the print is covered by means of a UV-curing or conventional film solution, and the transfer picture that has been formed therefrom is transferred onto a ceramic product and fired. Powders of gold, platinum, silver or other precious metals may additionally be added to the aforementioned paste. No details with respect to the synthetic-resin mixture can be gathered from this published application; the precious-metal compounds, for example, are designated only as synthetic-resin-sulfate gold (gold content 25 wt. %).

The bright-precious-metal preparation for the decoration of glass, ceramics and porcelain according to DE-PS 38 19 414 contains a soluble organic precious-metal compound and a UV-curable organic support, based on isobornyl acrylate and dicyclopentadienyl acrylate, and a photoinitiator, dissolved therein, from the group comprising the ketones and their derivatives, such as acetophenones, benzoin ethers, benzil ketals, ketoxime esters or thioxanthones. The preparation may additionally contain one or more oligomers with acrylate and/or with methyl acrylate groups. In addition, organic solvents, natural resins and synthetic resins may also contain agents for adjustment and modification of viscosity, and dyestuffs. It is also disclosed that burnished golds capable of being cured by photopolymerisation can be obtained by addition of gold powder and/or a sparingly soluble gold compound to the bright-gold preparation. The photoinitiators named in this document permit a radical mechanism to be inferred. The preparations described in the named applications do not exhibit the reactivity that is required for indirect printing in order to avoid an intense heating of the paper, or they generate brittle transfer pictures that do not burn out flawlessly.

In DE-PS 38 19 413, analogous to DE-PS 38 19 414, a system for lustres is presented wherein generally soluble organic metallic compounds are now employed instead of the soluble precious-metal compounds.

WO 03/022781 relates to a radiation-curable precious-metal preparation, in particular burnished-gold preparations, for the production of decorations on substrates that are suitable for decoration firing, said preparation containing a precious metal and a radiation-curing medium. The printing medium contains one or more particulate organic compounds, which are insoluble and incapable of swelling therein and which undergo substantially complete combustion in the course of decoration firing, as means for increasing the pigment volume concentration (PVC), by virtue of which the quality of the decoration is improved. The transfer pictures contain the precious-metal preparation in radiation-cured form. Only burnished-gold preparations are described, not bright-precious-metal preparations.

An overview with respect to the advantages of general UV screen-printing inks in comparison with conventional screen-printing inks can be found in *Der Siebdruck* 10 (2003) 18-33; no precious-metal preparations are described.

The named applications relating to UV bright-precious-metal preparations deal with preparations that, although they can be used in principle for the indirect decoration of suitable ceramic substrates, do not meet practical requirements, particularly with regard to the heating of the transfer paper that is associated with the exposure.

For multicolour printing, wherein the precious-metal print may represent one or more "colours", the heating of the paper is extraordinarily critical. From this a minimum reactivity of the UV-curable precious-metal preparations is deducible.

The UV bright-gold preparations described in the named applications do not exhibit the reactivity required for multicoloured indirect printing, or they generate brittle transfer pictures that do not burn out flawlessly.

The object of the invention consists in making available a radiation-curable, precious-metal-containing preparation for decorating stovable backings that results in wonderfully lustrous decorations for the production of a precious-metal decoration, both via indirect printing and via direct printing.

This object is achieved by virtue of Claim 1.

A radiation-curable precious-metal-containing preparation is made available for the purpose of decorating stovable backings, in particular ceramics, porcelain, bone china, tiles, stoneware and glass, glass ceramics, enamel, for the purpose of producing a precious-metal decoration based on one or more precious metals from the series comprising gold, silver, platinum and palladium, comprising at least one soluble precious-metal compound of Au, Ag, Pt and Pd, at least one or more fluxing agents consisting of organic metalloidal compounds and/or organometallic compounds and a radiation-curable printing medium, which is distinguished in that the radiation-curable printing medium comprises at least one radiation-curable cationically polymerisable monomeric compound from the series comprising the oxiranes, oxetanes and vinyl ethers or a combination of the named monomeric compounds.

By way of oxiranes, cycloaliphatic bisepoxides enter into consideration, in particular bisepoxides with substituted and unsubstituted cyclohexyl groups, such as 3,4-epoxycyclohexylmethyl-3,4-epoxycyclohexane carboxylate and bis(3,4-epoxycyclohexyl)adipate.

Also suitable are bisphenol A bisepoxides such as bisphenol A diglycidyl ethers and also oligomers thereof and bisphenol A diepoxymethyl ether, epoxidised novolaks and resols, terpene epoxides such as limonene oxide and limonene dioxide, 1,2-epoxyalkanes such as 1,2-epoxydecane, 1,2-epoxydodecane, 1,2-epoxytetradecane, 1,2-epoxyhexadecane, 1,2-epoxyoctadecane and alkanediol bisglycidyl ethers such as 1,6-hexanediol diglycidyl ether and 1,4-butanediol diglycidyl ether. The oxiranes may also include 1,2-epoxysilanes. The oxetanes are selected from aliphatically substituted oxetanes such as 3-ethyl-3-hydroxymethyloxetane, 3,3-dimethyl-2-(p-methoxyphenyl)oxetane, and the vinyl ethers are selected from aliphatically and/or aromatically substituted vinyl ethers. Examples of suitable vinyl ethers are 4-hydroxybutyl vinyl ether, cyclohexanedimethanol divinyl ether, triethylene glycol divinyl ether, dodecyl vinyl ether, 2-ethylhexyl vinyl ether, 2,3-dihydrofuran and 2,3-dihydropyran. It is preferred if the monomers from the series comprising the epoxides or oxetanes are present in a quantity of 10-90 wt. % and the monomers from the series comprising the vinyl ethers in combination with epoxides and/or oxetanes are present in a quantity of 5-50 wt. %, relative to the precious-metal preparation.

In addition, other radiation-polymerisable oligomers from the series comprising the oxiranes, oxetanes, oxolanes and vinyl ethers may be present in a quantity of 10-80 wt. %, and soluble, inert polymers not involved in the polymerisation may be present in a quantity of 0-60 wt. %, relative to the precious-metal preparation.

The term 'inert polymers' in the sense of the present invention is to be understood to mean resins such as phenolic resins, alkyd resins and hydrocarbon resins. These compounds may also be employed in sulfurised form. Additionally or alternatively, sulfur and/or other sulfur-containing compounds, such as, for example, sulfurised natural resins, terpenes etc., may also be included.

Furthermore, it has surprisingly been found that as a result of UV curing in accordance with a cationic mechanism, supplemented by a radically curing portion, both a sufficient reactivity and a satisfactory flexibility of the transfer picture are guaranteed.

For this reason it is favourable if in the case of the cationic system at least one radiation-curable monomeric compound from the series comprising the olefinic compounds containing a heterocyclic ring is additionally present.

It is preferred if the heterocyclic ring contains 4 to 8 ring members and, by way of heteroatom, one or more nitrogen and/or oxygen atoms, at least one radiation-polymerisable vinyl, acrylic or methacrylic group being bonded to the heterocyclic ring directly or via a single-membered to six-membered bridge-type cross-link, and a carbon atom adjacent to a ring heteroatom exhibiting at least one abstractable hydrogen atom.

The additional radiation-curable monomeric compound and the radiation-curable cationically polymerisable monomeric compound are present in this case in a ratio from 1:infinity to 1:0.2 (molar, relative to polymerisable groups).

The heterocyclic ring of the polymerisable monomeric compound may contain one or more heteroatoms chosen from nitrogen and/or oxygen. In a particularly preferred manner, it is a question of compounds with one or two oxygen atoms, one or two nitrogen atoms, or one oxygen atom and one nitrogen atom. The heterocyclic ring may be saturated or partially unsaturated, but not heteroaromatically, because in the latter case no carbon atom adjacent to the heteroatom can exhibit an abstractable hydrogen atom. On the assumption that a carbon atom adjacent to a heteroatom contains at least one abstractable hydrogen atom and that a substituent with a radiation-polymerisable vinyl, acrylic or methacrylic group is bonded to a further atom, the heterocyclic ring may contain further substituents, in particular alkyl groups with 1 to 12 C atoms, such as, particularly preferably, methyl, ethyl, n-propyl and isopropyl, alkoxy groups such as methoxy, ethoxy, methoxyethoxy, and alkoxy groups that contain more than one ether bridge, nitrile groups, ethoxycarbonyl and carbamide groups.

Preferred polymerisable monomeric compounds contain a heterocyclic ring selected from the series comprising

| | |
|---|---|
| (i) | dihydro- and tetrahydro-2-H-pyran, 1,3-dioxolane, 1,3- and 1,4-dioxan, benzo- and isobenzodihydrofuran, 2-H-chromene, 1-H-isochromene, chroman and isochroman, 3-benzoxepine, |

-continued

| | |
|---|---|
| (ii) | pyrroline and pyrrolidine, imidazoline and imidazolidine, piperidine, indoline and isoindoline, 1,2-dihydro- and tetrahydroquinoline and -isoquinoline, piperazine, perhydropyrimidine, and |
| (iii) | morpholine, perhydro-1,3-oxazine, 4H-dihydro-3,1-benzoxazine, 1,3-oxazoline, 1,3-oxazolidine. |

According to another embodiment, in the case of the heterocyclic ring of the monomeric polymerisable compound it is a question of a five-membered to seven-membered lactam ring, in particular the valerolactam ring and caprolactam ring, furthermore also the hydantoin ring. The polymerisable group is expediently bonded to the lactam nitrogen directly or via a bridge-type cross-link containing 1 to 4 C atoms. In the case of the polymerisable group it may preferably be a question of a group from the series comprising vinyl, acrylic, methacrylic, (meth)acryloyloxy-($C_1$-$C_4$)-alkyl or (meth)acryloylamino-($C_1$-$C_4$)-alkyl substituents. The formulation '(meth)acrylic' stands alternatively for acrylic or methacrylic in each instance.

According to another preferred embodiment, in the case of the heterocyclic ring it is a question of a 1,3-dioxolane ring, a 1,3- or 1,4-dioxan ring. Particularly preferred polymerisable compounds with a heterocyclic ring are trimethylolethane monoformal mono(meth)acrylic ester and trimethylolpropane monoformal mono(meth)acrylic ester.

Further particularly preferred polymerisable compounds are valerolactam, caprolactam and hydantoin as well as, optionally, methyl-substituted derivatives that contain the polymerisable group bonded directly to the lactam nitrogen.

The precious-metal preparations according to the invention contain, in generally customary quantity, one or more fluxing agents known to a person skilled in the art. Ordinarily, soluble organic compounds of Al, B, Ba, Bi, Ca, Ce, Co, Cr, Cu, Fe, Ga, Ge, Ir, Mn, Mo, Ni, Os, Pb, Rh, Ru, Se, Si, Sn, Ta, Ti, V, W, Zn, Zr are present in the medium by way of fluxing agent. In the case of burnished golds, these fluxing agents may also be present in the form of insoluble oxides, salts and/or glasses, such as, for example, alkali borosilicates. The quantities used may lie within a fairly wide range and are known in the literature. With a view to precise establishment of the flux constituents and the quantities thereof, a person skilled in the art will carry out tentative experiments.

The radiation-curable printing medium must additionally contain 1-20 wt. % of a photoinitiator.

Exemplary photoinitiators are ketals such as benzyl dimethyl ketal; benzoins such as benzoin methyl ether, benzoin ethyl ether; anthraquinones such as 1-chloroanthraquinone and 2-ethylanthraquinone; benzophenols such as benzophenone, p-dimethylaminobenzophenone; propiophenones such as 2-hydroxy-2-methylpropiophenone; dibenzosuberone; sulfur-containing compounds such as dimethyl disulfide, tetramethylthiurane disulfide, thioxanthone, bisacylarylphosphine oxides, acylbisarylphosphine oxides, acylarylalkylphosphine oxides, acylarylalkoxyphosphine oxides, aryldiazonium, diaryliodonium, triarylsulfonium, triarylselenonium, dialkylphenacylsulfonium, triarylsulfoxonium, aryloxydiarylsulfoxonium and dialkylphenacylsulfoxonium salts.

Diaryliodonium and triarylsulfonium salts are preferred. The use of sensitisers such as thioxanthones is customary.

Furthermore, it has been found that radically curing preparations also become at least distinctly more reactive if acylphosphines are used concomitantly by way of photoinitiators.

In the case where acylphosphine oxides/phosphinates are employed, bis(2,4,6-trimethylbenzoyl)phenylphosphine oxide, 2,4,6-trimethylbenzoyldiphenylphosphine oxide and ethyl-2,4,6-trimethylbenzoylphenylphosphinate are particularly preferred.

The so-called hybrid systems are especially advantageous with regard to reactivity if the radically curing portion of the formulation both contains heterocyclic monomers and is at least co-initiated with acylphosphine oxides/phosphinates.

In addition, one or more additives from the series comprising the defoamers, phthalate plasticisers, surface-modification agents, thixotroping agents and dispersing agents may be employed. In addition, matting agents such as oxides, silicates and aluminosilicates can be used.

In the case of these additives it is a question of additives known to a person skilled in the art, which are employed in effective quantity, ordinarily in a quantity of 0.1-10 wt. %.

In the case of the precious-metal preparations according to the invention it may be a question of bright-precious-metal preparations or burnished-precious-metal preparations. Preferred are bright preparations, in particular bright-gold preparations, that contain, in addition to one or more gold compounds, compounds of silver and/or palladium and/or platinum for the purpose of hue modification. UV bright-gold preparations contain 6-30 wt. % precious metals in the form of organic compounds, in particular organic sulfurous compounds, that are soluble in the medium, such as thiolates for example. A precious-metal content of 8-25% is preferred.

If gold thiolates are employed, it is preferred that these additionally contain further functional groups such as ether, ester and/or keto functions, by virtue of which the solubility of the gold compound in the radiation-curable printing medium is enhanced.

Burnished-gold preparations contain, alternatively or preferably in addition, insoluble precious-metal compounds and/or elemental precious metal; the gold content is generally 12-50 wt. %, preferably 16-40 wt. %.

The invention further provides a transfer picture, the decoration-forming layer of which has been generated using the precious-metal preparation according to the invention. The precious-metal preparation can be applied by a customary direct-printing process or by indirect printing—that is to say, via a transfer picture—onto a substrate that is suitable for decoration firing, such as glass, ceramics, porcelain, bone china and other siliceous materials, and can be stoved thereon under customary conditions, whereby high-quality decorations are obtained.

For the purpose of producing a ceramic decoration, a radiation-curable precious-metal preparation according to the invention is applied onto the substrate to be decorated by a direct or indirect printing process, in particular by a screen-printing process. The decorative layer is cured by irradiation of the decorative layer with UV light or with a different high-energy radiation. After this, the substrate is stoved under suitable decoration-firing conditions.

The precious-metal preparations according to the invention are distinguished by good radiation curability and exhibit the demanded combination of properties with regard to high reactivity and hence rapid curing and absence of tackiness of the decorative layer and high flexibility of the decorative layer, with the capacity to obtain sharply contoured, flawless decorations. One particular advantage of the precious-metal preparations according to the invention consists in the fact that transfer pictures produced therewith retain their flexibility also after a long period of storage, and the feared embrittlements and hence fractures in the decoration do not occur. It has not hitherto been possible to obtain this combination of properties by means of precious-metal preparations pertaining to the state of the art.

The invention will be described below with reference to the Examples, which do not limit the invention.

EXAMPLE 1

Hybrid System

| | |
|---|---|
| gold mercaptide (about 40% Au) | 21% |
| sulfurised alkylphenolic resin | 16% |
| trimethylolpropane monoformal acrylates | 30% |
| 3,4-epoxycyclohexylmethyl-3,4-epoxycyclohexane carboxylate | 20.5% |
| Rh naphthenates (5% Rh) | 2.5% |
| [4-(2-methylpropyl)phenyl](4-methylphenyl)iodonium-hexafluorophosphate | 4.5% |
| bis(2,4,6-trimethylbenzoyl)phenylphosphine oxide | 2.5% |
| 2-hydroxy-2-methyl-1-phenylpropanone | 2.5% |
| defoamer Byk 088 | 0.5% |

EXAMPLE 2

Cationic System

| | |
|---|---|
| gold mercaptide (about 40% Au) | 32% |
| sulfurised alkylphenolic resin | 5% |
| Rh naphthenates (5% Rh) | 1% |
| Cr naphthenates (10% $Cr_2O_3$) | 0.3% |
| Bi naphthenates (20% $Bi_2O_3$) | 1.6% |
| 3,4-epoxycyclohexylmethyl-3,4-epoxycyclohexane carboxylate | 51% |
| triarylsulfonium hexafluorophosphate | 7% |
| [4-(2-methylpropyl)phenyl](4-methylphenyl)iodonium-hexafluorophosphate | 1% |
| defoamer Byk 088 | 1.1% |

All the constituents are dissolved in the monomers at temperatures of up to 80° C., subject to stirring.

EXAMPLE 3

Burnished-gold Preparation

| | |
|---|---|
| bright gold according to Example 2 | 85.54 |
| gold powder | 14.26 |
| lead borosilicate | 0.20 |

The feed materials are homogenised for 48 h in a ball mill.

The preparations described above (Examples 1-2) were printed using a screen (e.g. polyester 120-31 (thread-count—yarn-diameter [µm]) or 165-31) onto transfer paper of the Trucal brand in a Fleischle printing machine, cured in a UV drier and subsequently filmed over using a commercial film solution (Product No. 80 450, Ferro GmbH) and a polyester screen 27-120. The transfer pictures were absorbed onto porcelain and were subsequently fired by normal firing at 820° C., heating-up rate 400 K/h, holding time 10 min, cooling rate 400 K/h, or by fast firing at 880° C., heating-up rate 1600 K/h, holding time 1 min, cooling rate 1600 K/h. A beautifully lustrous decoration is obtained.

The preparation according to Example 3 was printed using a polyester 90-40 screen onto transfer paper of the Trucal brand using manual screen printing, was cured in a UV drier, and was subsequently filmed over using a commercial film solution (Product No. 80 450, Ferro GmbH) and a polyester screen 27-120. The transfer pictures were absorbed onto porcelain and were subsequently fired by normal firing at 820° C., heating-up rate 400 K/h, holding time 10 min, cooling rate 400 K/h, or by fast firing at 880° C., heating-up rate 1600 K/h, holding time 1 min, cooling rate 1600 K/h. Subsequently the preparation was buffed with a glass-fibre brush. A beautiful satin-finished decoration is obtained.

The preparations described (Examples 1-3) were also applied by direct printing and here, under the stated firing conditions, led to good burn-out results.

The invention claimed is:

1. A radiation-curable precious-metal-containing preparation comprising:
    at least one soluble precious metal compound containing an element selected from the group consisting of Au, Ag, Pt and Pd;
    one or more fluxing agents selected from the group consisting of organic metalloidal compounds and/or organometallic compounds; and
    a radiation-curable printing medium, wherein the radiation-curable printing medium comprises at least one radiation-curable cationically polymerisable monomeric compound selected from the group consisting of oxiranes, oxetanes, vinyl ethers and combinations thereof.

2. The preparation according to claim 1, wherein:
    the oxiranes are cationically polymerisable epoxides selected from the group consisting of cycloaliphatic bisepoxides, bisphenol A bisepoxides, novolak epoxides, terpene epoxides, alkanediol bisglycidyl ethers, and 1,2-epoxysilanes;
    the oxetanes are aliphatically substituted oxetanes; and
    the vinyl ethers are aliphatically substituted vinyl ethers.

3. The preparation according to claim 1, wherein:
    when the at least one radiation-curable cationically polymerisable monomeric compound is one or more oxiranes or oxetanes, said oxiranes or oxetanes are present in a quantity of 10-90 wt. % relative to the precious-metal-containing -prepartion, and
    when the at least one radiation-curable cationically polymerisable monomeric compound is one or more vinyl ethers in combination with oxiranes and/or oxetanes, said vinyl ethers in combination with said oxiranes and/or oxetanes are present in a quantity of 5-50 wt. % relative to the precious-metal -containing-preparation.

4. The preparation according to claim 1, further comprising:
    one or more radiation-polymerisable oligomers selected from the group consisting of oxiranes, oxetanes, oxolanes, vinyl ethers and combinations thereof, wherein said radiation-polymerisable oligomers are present in a quantity of 10-80 wt. % relative to the precious-metal-containing-preparation, and
    optionally, soluble, inert polymers not involved in the polymerisation and/or sulfur and/or sulfur-containing compounds, wherein said soluble, inert polymers, sulfur and/or sulfur-containing compounds are present in a quantity of 0-60 wt. % relative to the precious-metal-containing-preparation.

5. The preparation according to claim 1, wherein the printing medium further comprises at least one additional radically initiatable, radiation-curable monomeric compound selected from olefinic compounds containing a heterocyclic ring.

6. The preparation according to claim 5, wherein the heterocyclic ring contains 4 to 8 ring members and by way of heteroatom one or more nitrogen and/or oxygen atoms, at least one radiation-polymerisable vinyl, acrylic or methacrylic group is bonded to the heterocyclic ring directly or via a one-membered to six-membered bridge cross-link, and a carbon atom adjacent to a ring heteroatom exhibits at least one abstractable hydrogen atom.

7. The preparation according to claim 5, wherein the at least one additional radiation-curable monomeric compound and the radiation-curable cationically polymerisable monomeric compound are present in a ratio from 1:infinity to 1:0.2.

8. The preparation according to claim 5, wherein the heterocyclic ring of the additional radiation-curable monomeric compound is selected from the group consisting of:
    dihydro-2-H-pyran, tetrahydro-2-H-pyran, 1,3-dioxolane, 1,3-dioxan, 1,4-dioxan, benzo-dihydrofuran, isobenzodihydrofuran, 2-H-chromene, 1-H-isochromene, chroman, isochroman, 3-benzoxepine,
    pyrroline, pyrrolidine, imidazoline, imidazolidine, piperidine, indoline, isoindoline, 1,2-dihydroquinoline, tetrahydroquinoline, isoquinoline, piperazine, perhydropyrimidine,
    morpholine, perhydro-1,3-oxazine, 4H-dihydro-3,1 -benzoxazine, 1,3-oxazoline, and 1,3-oxazolidine.

9. The preparation according to claim 8, wherein the additional radiation-curable monomeric compound exhibits a five-membered to seven-membered lactam ring, and the polymerisable group is bonded to the lactam nitrogen.

10. The preparation according to claim 8, wherein the additional radiation-curable monomeric compound exhibits a 1,3-dioxolane ring, a 1,3- or 1,4-dioxan ring and a (meth) acryloyloxy-(C1-C4)-alkyl or (meth) acryloylamino-(C1-C4)-alkyl substituent.

11. The preparation according to claim 1, wherein the one or more fluxing agents are metalloidal compounds and/or organometallic compounds of elements selected from the group consisting of Al, B, Ba, Bi, Ca, Ce, Co, Cr, Cu, Fe, Ga, Ge, Ir, Mn, Mo, Ni, Os, Pb, Rh, Ru, Se, Si, Sn, Ta, Ti, V, W, Zn and Zr.

12. The preparation according to claim 1, wherein the printing medium contains 1-20 wt. % of a photoinitiator relative to the precious-metal-containing-preparation.

13. The preparation according to claim 1, further comprising one or more additives selected from the group consisting of defoamers, phthalate plasticisers, surface-modification agents, thixotroping agents and dispersing agents, and wherein the total quantity of said additives is up to 10 wt. % relative to the precious-metal-containing-preparation.

14. The preparation according to claim 1, wherein the precious-metal content is between 6% and 30 wt. % relative to the precious-metal -containing-preparation.

15. The preparation according to claim 1, further comprising matting agents selected from the group consisting of oxides, silicates and aluminosilicates.

16. The preparation according to claim 1, further comprising precious-metal powder and/or at least one insoluble precious-metal compound, the precious-metal content amounting to 12-50 wt. %, relative to the precious-metal-containing-preparation.

17. A transfer picture for producing precious-metal decorations, comprising a flexible supporting material, a separation layer capable of being activated by water or thermally, thereupon a picture layer and, thereabove, a covering layer, wherein the picture layer has been obtained by applying a radiation-curable precious-metal-containing-preparation according to claim 1.

18. A process for producing a precious-metal decoration onto a ceramic substrate comprising:

overprinting a precious-metal-containing-preparation according to claim 1 onto the ceramic substrate or onto a transfer support to form decorative layer and, in the case where the precious-metal-containing-preparation is overprinted on the transfer support, transferring the decorative layer from the transfer support onto the ceramic substrate;

irradiating the ceramic substrate to cure the decorative layer; and stoving the decorative layer under decoration firing conditions.

\* \* \* \* \*